(12) United States Patent
Ono et al.

(10) Patent No.: US 9,760,230 B2
(45) Date of Patent: Sep. 12, 2017

(54) TOUCH SCREEN, TOUCH PANEL, DISPLAY DEVICE, AND ELECTRONIC DEVICE

(71) Applicant: Mitsubishi Electric Corporation, Tokyo (JP)

(72) Inventors: Takeshi Ono, Tokyo (JP); Tatsuya Nakamura, Tokyo (JP); Takashi Miyayama, Tokyo (JP); Masafumi Agari, Tokyo (JP); Tae Orita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/844,296

(22) Filed: Sep. 3, 2015

(65) Prior Publication Data

US 2016/0077629 A1 Mar. 17, 2016

(30) Foreign Application Priority Data

Sep. 17, 2014 (JP) .................................. 2014-188427

(51) Int. Cl.
*G06F 3/044* (2006.01)

(52) U.S. Cl.
CPC .... *G06F 3/044* (2013.01); *G06F 2203/04111* (2013.01)

(58) Field of Classification Search
USPC ........................................................ 345/174
See application file for complete search history.

(56) References Cited

U.S. PATENT DOCUMENTS

| 5,844,506 A | 12/1998 | Binstead |
| 6,137,427 A | 10/2000 | Binstead |
| 6,452,514 B1 | 9/2002 | Philipp |
| RE40,867 E | 8/2009 | Binstead |
| 8,269,744 B2 | 9/2012 | Agari et al. |
| 8,390,598 B2 | 3/2013 | Agari et al. |
| 2007/0268422 A1* | 11/2007 | Song ................. G02F 1/136286 349/43 |
| 2010/0060602 A1* | 3/2010 | Agari ...................... G06F 3/044 345/173 |
| 2011/0298699 A1* | 12/2011 | Goto ...................... G06F 3/0202 345/156 |
| 2013/0242485 A1 | 9/2013 | Ohtani et al. |
| 2013/0293809 A1* | 11/2013 | Kuroda ............. G02F 1/136286 349/61 |

(Continued)

FOREIGN PATENT DOCUMENTS

| JP | 9-511086 A | 11/1997 |
| JP | 2003-526831 A | 9/2003 |

(Continued)

*Primary Examiner* — Jennifer Mehmood
*Assistant Examiner* — Deeprose Subedi
(74) *Attorney, Agent, or Firm* — Studebaker & Brackett PC

(57) ABSTRACT

A touch screen according to the present invention includes: a substrate; and a plurality of row direction wirings and a plurality of column direction wirings which are disposed on the substrate to intersect through an insulating film in a stereoscopic view, and at an intersection portion of each of the row direction wirings and each of the column direction wirings, wiring width of at least one of the row direction wiring and the column direction wiring is wider than a portion other than the intersection portion in a plan view.

10 Claims, 7 Drawing Sheets

(56) References Cited

U.S. PATENT DOCUMENTS

2014/0116756 A1\* 5/2014 Jiang ..................... G06F 3/041
                                                                           174/253

FOREIGN PATENT DOCUMENTS

| JP | 2010-61502 A | 3/2010 |
| JP | 2012-103761 A | 5/2012 |
| WO | 95/27334 A1 | 10/1995 |
| WO | 00/44018 A1 | 7/2000 |

\* cited by examiner

TOUCH SCREEN, TOUCH PANEL, DISPLAY DEVICE, AND ELECTRONIC DEVICE

BACKGROUND OF THE INVENTION

Field of the Invention

The present invention relates to a touch screen, a touch panel, a display device and an electronic device.

Description of the Background Art

A touch panel is a device which detects a touch of a finger or the like and specifies a position coordinate of a touched position. The touch panel is gaining attention as one of good user interface means. Currently, touch panels of various types such as a resistive type and a capacitive type are made into products. Generally, a touch panel includes a touch screen in which a touch sensor is built, and a detection device which specifies a touched position coordinate based on a signal from the touch screen.

One of the capacitive touch panels includes a projected capacitive touch panel (see, for example, Japanese Patent Application Laid-Open No. 2012-103761). Such a projected capacitive touch panel can detect a touch even when a front surface side of the touch screen in which a touch sensor is built is covered by a protection plate such as a glass plate having the thickness of about several mm. The touch panel of this type allows the protection plate to be arranged in the front surface and, consequently, has good toughness. Further, this touch panel can detect a touch with a glove put on. Furthermore, the touch panel does not include a movable portion and therefore have a long operating life.

The projected capacitive touch panel includes, for example, a first series of conductor elements which are formed on a thin dielectric film, and a second series of conductor elements which are formed on the first series of conductor elements across an insulating film as detection wirings which detect an electrostatic capacitance. Each conductor element does not electrically contact with each other, and a plurality of intersections are formed between the conductor elements. A detection circuit detects an electrostatic capacitance formed between a pointer such as a finger, and the first series of conductor elements and the second series of conductor elements which are the detection wirings to specify a position coordinate of a position touched by the pointer. This detection type is generally called a self-capacitance detection type (see, for example, Japanese Unexamined Patent Application Publication (Translation of PCT Application) No. 9-511086 (1997)).

Further, for example, there is a detection method of specifying a touched position coordinate by, for example, detecting a change in an electric field between a plurality of row wirings which composes a first electrode and is provided to extend in a row direction and a plurality of column wirings which composes a second electrode and is provided to extend in a column direction, i.e., by detecting a change in a mutual capacitance. This detection method is generally called a mutual capacitance detection type (see, for example, Japanese Unexamined Patent Application Publication (Translation of PCT Application) No. 2003-526831).

In either case of the self-capacitance type and the mutual capacitance type, there is generally used a method, in which when a pointer such as a finger touches a planar region (detection cell) partitioned in a grid pattern by row wirings and column wirings, a touched position coordinate is specified based on a balance between a detection value of a sensor block and a detection value of a detection cell near the sensor block.

Further, recently, a mesh is formed by using low-resistance metal for detection wirings (see, for example, Japanese Patent Application Laid-Open No. 2010-061502) to realize a larger and high-performance touch screen by taking advantage of lower-resistance characteristics than transparent electrodes such as ITO.

According to a configuration where a mesh of row wirings formed as micro wirings and a mesh of column wirings formed as micro wirings three-dimensionally intersect across an insulating film as disclosed in, for example, Japanese Patent Application Laid-Open No. 2010-061502, local cross capacitances at three-dimensional intersection portions of row wirings and column wirings are low. Hence, there is a problem that a conductor such as finger approaches the touch panel, a potential difference is likely to be produced when electrostatic discharge occurs and dielectric breakdown is likely to occur.

SUMMARY OF THE INVENTION

An object of the present invention is to provide a reliable touch screen which hardly causes dielectric breakdown due to electrostatic discharge from a conductor on a touch panel.

A touch screen according to the present invention includes: a substrate; and a plurality of row direction wirings and a plurality of column direction wirings which are disposed on the substrate to intersect through an insulating film in a stereoscopic view. In the touch screen, at an intersection portion of each of the row direction wirings and each of the column direction wirings, wiring width of at least one of the row direction wiring and the column direction wiring is wider than a portion other than the intersection portion in a plan view.

By widening the wiring width of at least one of the row direction wiring and the column direction wiring at the intersection portion of the row direction wiring and the column direction wiring, it is possible to locally increase cross capacitance at three-dimensional intersection portion of the row direction wiring and the column direction wiring. Thus, a potential difference is hardly produced between the row direction wirings and the column direction wirings. Consequently, it is possible to provide a reliable touch screen which suppresses occurrence of dielectric breakdown due to electrostatic discharge.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
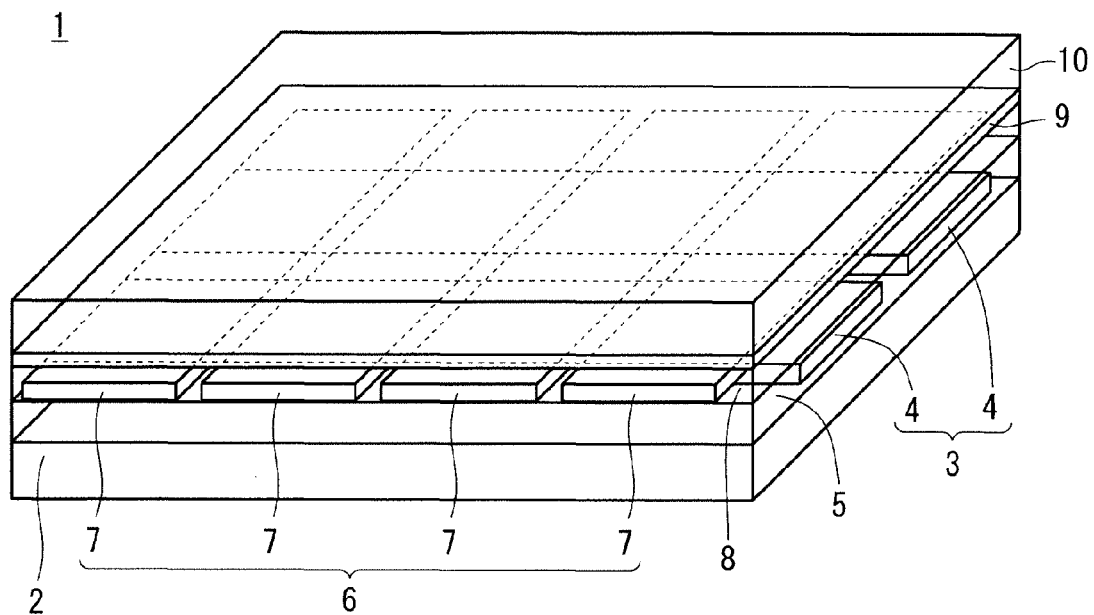
FIG. 1 is a perspective view illustrating an example of a configuration of a touch screen according to the first preferred embodiment.

FIG. 1 is a perspective view illustrating an example of a configuration of a touch screen 1 according to the first preferred embodiment. In addition, the touch screen 1 is a projected capacitive touch screen.

For a lowermost surface layer of the touch screen 1, a transparent substrate 2 made of a transparent glass material or transparent resin is provided. A lower electrode 3 is formed on the transparent substrate 2, and an inter-layer insulating film 5 is formed to cover the lower electrode 3. The inter-layer insulating film 5 is a transparent (translucent) insulating film such as a silicon nitride film or a silicon oxide film.

An upper electrode 6 is formed on the inter-layer insulating film 5, and a protective film 8 is formed to cover the upper electrode 6. Similar to the inter-layer insulating film 5, the protective film 8 is a transparent insulating film such as a silicon nitride film or a silicon oxide film.

A polarizing plate 9 for a liquid crystal display to which the touch screen 1 is attached is provided (attached) on the protective film 8. Further, a transparent substrate 10 made of a transparent glass material or transparent resin is provided on the polarizing plate 9 to protect the touch screen 1. The transparent substrate 10 is adhered to the polarizing plate 9.

The lower electrode 3 includes a plurality of row direction wirings 4 made of transparent wiring materials such as ITO or metal wiring materials such as aluminum or copper. Further, similar to the row direction wirings 4, the upper electrode 6 includes a plurality of column direction wirings 7 made of transparent wiring materials such as ITO or metal wiring materials such as aluminum or copper. A plurality of row direction wirings 4 and a plurality of column direction wirings 7 are disposed on the transparent substrate 2 to intersect through the inter-layer insulating film 5 in a stereoscopic view.

According to the first preferred embodiment, the row direction wirings 4 and the column direction wirings 7 adopt a layered structure of an aluminum alloy layer and its nitride layer. Consequently, it is possible to reduce a wiring resistance and reduce the reflectance of light in a detectable area. In this regard, the detectable area refers to an area of the touch screen 1 which can detect a touch of a pointer such as a finger (details will be described later).

In addition, in the first preferred embodiment, the column direction wirings 7 are arranged above the row direction wirings 4. However, the row direction wirings 4 may be arranged above the column direction wirings 7. Alternatively, the row direction wirings 4 and the column direction wirings 7 may be arranged in the same layer and may be electrically insulated by arranging the inter-layer insulating film 5 at a portion at which the row direction wirings 4 and the column direction wirings 7 overlap in a plan view (intersect in a stereoscopic view).

The row direction wirings 4 and the column direction wirings 7 adopt a multilayer structure of the aluminum alloy layer and its nitride layer, yet are not limited to this structure. For example, the column direction wirings 7 may adopt a multilayer structure of the aluminum alloy layer and its nitride layer, and the row direction wirings 4 may be made of transparent wiring materials such as ITO.

A user performs an operation by touching the transparent substrate 10 which is the surface of the touch screen 1 by the pointer such as the finger. When the pointer contacts (touches) the transparent substrate 10, capacitive coupling (touch capacitance) occurs between the pointer and the row direction wirings 4 or the column direction wirings 7. In case of the mutual capacitive type, by detecting a change in the mutual capacitance produced between the upper electrode 6 and the lower electrode 3 (i.e., between the column direction wirings 7 and the row direction wirings 4) when the touch capacitance is produced, it is possible to specify which position in the detectable area is touched.

Figure 2:
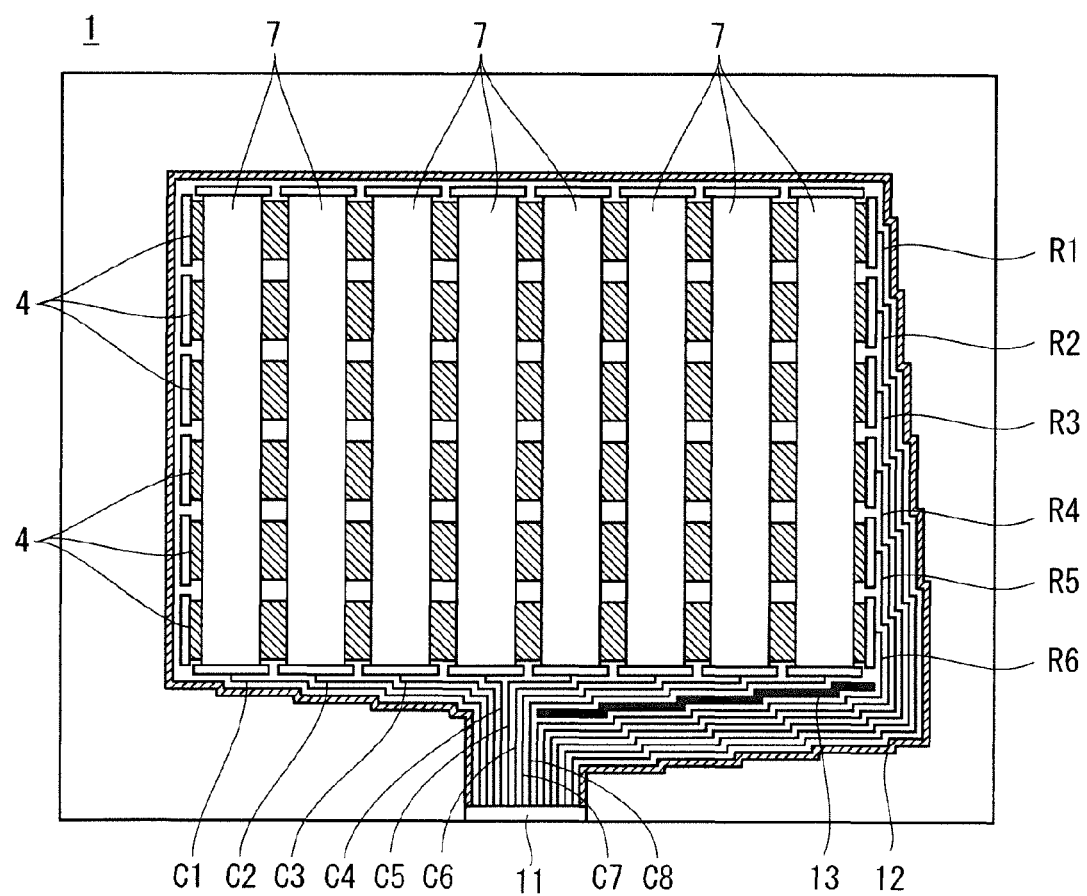
FIG. 2 is a plan view illustrating an example of a configuration of the touch screen according to the first preferred embodiment.

FIG. 2 is a plan view illustrating an example of a configuration of the touch screen 1. The detectable area of the touch screen 1 is a matrix region formed by a plurality of row direction wirings 4 provided to extend in the row direction (a horizontal direction in FIG. 2) and a plurality of column direction wirings 7 provided to extend in the column direction (the vertical direction in FIG. 2) on the front side of the row direction wirings 4.

Each row direction wiring 4 is connected to a terminal 11 which electrically connects with an external wiring through lead wires R1 to R6. Each column direction wiring 7 is connected to the terminal 11 through lead wires C1 to C8. Further, a dummy lead wire 13 is arranged between the lead wire R6 and the lead wire C8.

The lead wires R1 to R6 and the lead wires C1 to C8 are tightly arranged at an outer circumference side of the detectable area. In this regard, the lead wires R1 to R6 are arranged such that the lead wire R6 of the shortest length is arranged at the innermost side, and the other lead wires R1 to R5 are arranged along the lead wire R6. Further, the lead wire C4 of the shortest length serves as a reference among the lead wires C1 to C8, and the other lead wires C1 to 3 and the lead wires C5 to 8 are arranged along the lead wire C4.

Thus, the lead wires R1 to R6 and the lead wires C1 to C8 are tightly arranged on the outer circumference side of the detectable area. Consequently, it is possible to suppress a fringe capacitance produced between a display device to which the touch screen 1 is attached, and the lead wires (lead wires R2 to R6 and the lead wires C2 to C8) other than the lead wire R1 and the lead wire C1 at the outermost rim.

Further, at the outer side of the lead wire R1 and the lead wire C1, a shield wiring 12 which receives an input of a ground potential is arranged. That is, the shield wiring 12 is disposed to surround each row direction wiring 4, each column direction wiring 7 and each of the lead wires R1 to R6 and C1 to C8 in a plan view. The shield wiring 12 is arranged, so that it is possible to suppress a fringe capacitance produced between the display device to which the touch screen 1 is attached, and the lead wire R1 and the lead wire C1.

The lead wires R1 to R6 and the lead wires C1 to C8 are arranged as described above, so that it is possible to reduce an influence of electromagnetic noise, produced by the display device to which the touch screen 1 is attached, working on the lead wires.

Figure 3:
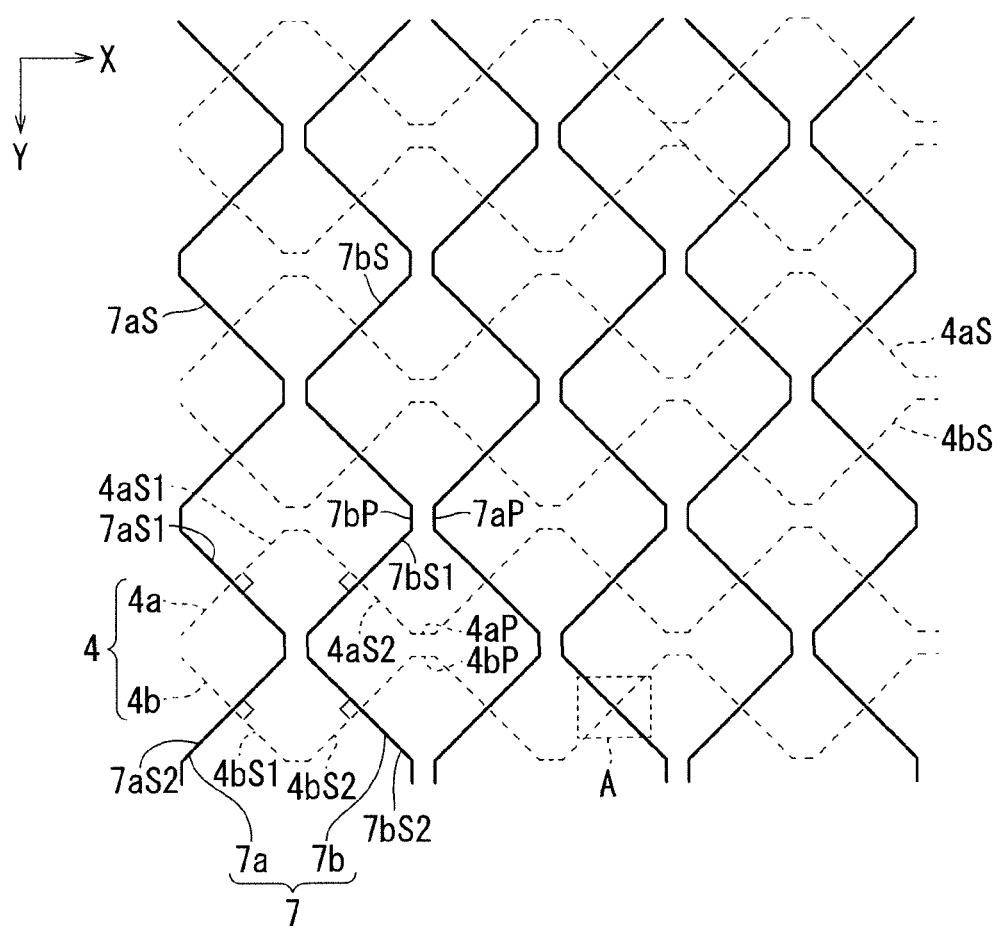
FIG. 3 is a plan view illustrating an example of a configuration of row direction wirings and column direction wirings of the touch screen according to the first preferred embodiment.

Next, a detailed configuration of the row direction wirings 4 and the column direction wirings 7 will be described with reference to FIG. 3. As illustrated in FIG. 3, each column direction wiring 7 includes a pair of (1) a first metal wiring 7*a* of a zig-zag pattern in which first inclined portions 7*a*S which are diagonally inclined at an inclination angle of 45° with respect to a column direction y and first parallel portions 7*a*P which are parallel to the column direction y and are connected to the first inclined portions 7*a*S are repeatedly disposed in a zig-zag pattern along the column direction y, and (2) a second metal wiring 7*b* employing a line symmetrical configuration with respect to the first metal wiring 7*a* around the column direction y.

Similarly, each row direction wiring 4 includes a pair of (3) a third metal wiring 4*a* of a zig-zag pattern in which second inclined portions 4*a*S which are diagonally inclined at an inclination angle of 45° with respect to a row direction x and second parallel portions 4*a*P which are parallel to the row direction x and are connected to the second inclined portions 4*a*S are repeatedly disposed in a zig-zag pattern along the row direction x, and (4) a fourth metal wiring 4*b* employing a line symmetrical configuration with respect to the third metal wiring 4*a* around the row direction x.

Moreover, in each area in which one arbitrary column direction wiring 7 of a plurality of column direction wirings 7 and one arbitrary row direction wiring 4 of a plurality of row direction wirings 4 three-dimensionally intersect, the following positional relationship holds.

That is, a center point (center portion) of one inclined portion 7*a*S1 of the two first inclined portions 7*a*S of the first metal wiring 7*a* belonging to each area three-dimensionally intersects at a right angle at all times with a center point (center portion) of one inclined portion 4*a*S1 of the two second inclined portions 4*a*S of the third metal wiring 4*a* belonging to the area. That is, a center point (center portion) of an other inclined portion 7*a*S2 of the two first inclined portions 7*a*S of the first metal wiring 7*a* belonging to the area three-dimensionally intersects at a right angle at all times with a center point (center portion) of one inclined portion 4*a*S1 of two second inclined portions 4*b*S of the fourth metal wiring 4*b* belonging to the area.

Further, a center point (center portion) of one inclined portion 7*b*S1 of two first inclined portions 7*b*S of the second metal wiring 7*b* belonging to the area three-dimensionally intersects at a right angle at all times with a center point (center portion) of an other inclined portion 4*a*S2 of the two second inclined portions 4*a*S of the third metal wiring 4*a* belonging to the area. A center point (center portion) of an other inclined portion 7*b*S2 of two first inclined portions 7*b*S of the second metal wiring 7*b* belonging to each area three-dimensionally intersects at a right angle at all times with a center point (center portion) of an other inclined portion 4*b*S2 of two second inclined portions 4*b*S of the fourth metal wiring 4*b* belonging to the area.

By setting an orthogonal relationship between the inclined portions as described above, the dimensions of the parallel portions 7*a*P, 7*b*P, 4*a*P and 4*b*P in the area along the row direction x are minimized.

Figure 5:
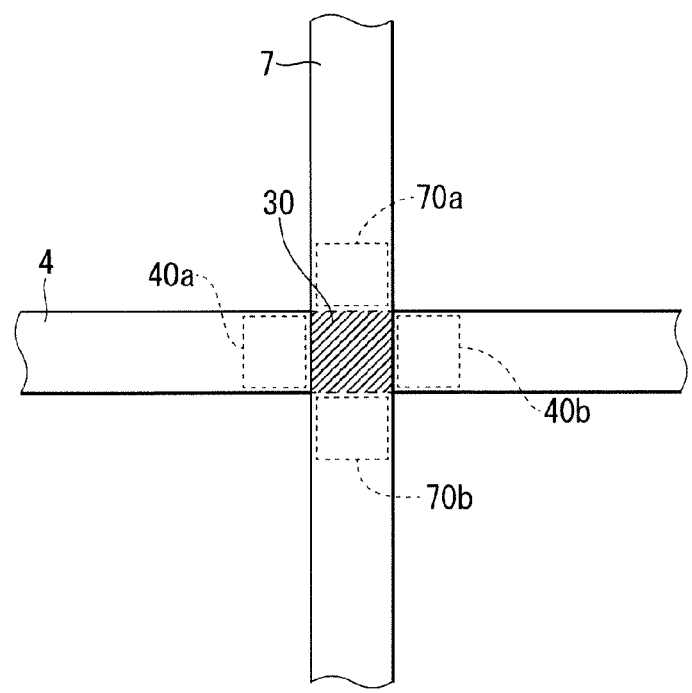
FIG. 5 is an enlarged view of an intersection portion of the row direction wiring and the column direction wiring of the touch screen according to a prerequisite technique.

By employing the configuration illustrated in FIG. 3, it is possible to minimize a value of a parasitic capacitance produced between the column direction wirings 7 and the row direction wirings 4. Further, it is possible to make substantially smaller an entire area of a portion at which the column direction wirings 7 and the row direction wirings 4 are not provided in a plan view than an area in case where the configuration illustrated in FIG. 5 is not employed. Consequently, it is possible to uniformly detect in each area a touch capacitance including an electrostatic capacitance produced between a pointer such as a finger and the column direction wirings 7 and an electrostatic capacitance produced between the pointer and the row direction wirings 4.

Furthermore, when a display panel (e.g. an LCD panel) is attached to the touch screen 1 such that the row direction x and the column direction y of the touch screen 1 employing the configuration illustrated in FIG. 3 are parallel to the row direction and the column direction of a pixel pattern of the display panel attached to the touch screen 1, the first metal wirings 7*a*, the second metal wirings 7*b*, the third metal wirings 4*a* and the fourth metal wirings 4*b* which are respectively the zig-zag patterns of the column direction wirings 7 and the row direction wirings 4 are arranged on each pixel in an oblique direction inclined at an angle of 45° with respect to alignment directions of the row direction and the column direction of the pixel pattern. Hence, part of pixels are uniformly covered, so that it is possible to make uniform the transmittance of display light which has been emitted from the display panel and passes through the touch screen 1, and reduce occurrence of a moire phenomenon.

As illustrated in FIG. 3, the row direction wirings 4 and the column direction wirings 7 are meshed wirings, so that a small wiring area can cover a broad detectable area.

In addition, materials and shapes of the row direction wirings 4 and the column direction wirings 7 are not limited to the above. For materials of the row direction wirings 4 and the column direction wirings 7, transparent conductive materials such as ITO or graphene or metal materials such as aluminum, chrome, copper and silver can be used. Further, alloy such as aluminum, chrome, copper and silver or a multilayer structure obtained by forming aluminum nitride on the alloy may be used for the materials. Furthermore, a conductive wire width and a mesh interval may take different values from the above according to use of the touch screen, etc.

Figure 4:
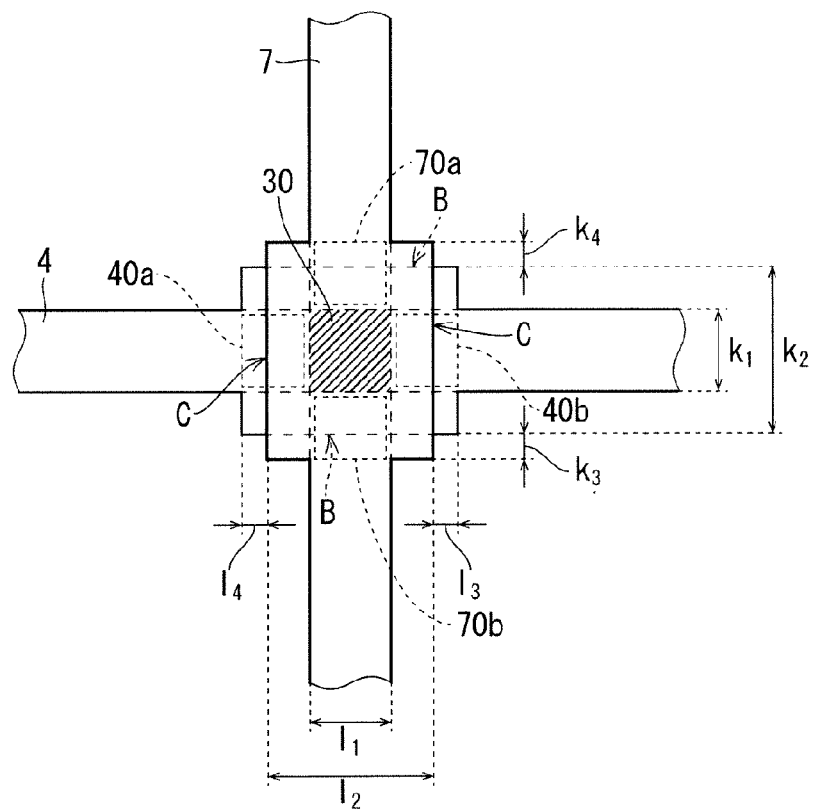
FIG. 4 is an enlarged view of an intersection portion of the row direction wiring and the column direction wiring of the touch screen according to the first preferred embodiment.

FIG. 4 is an enlarged view illustrating a region A of the touch screen 1 in FIG. 3 according to the present preferred embodiment (i.e., the enlarged view of the intersection portion of the row direction wiring 4 and the column direction wiring 7). FIG. 5 is an enlarged view of an intersection portion of a row direction wiring and a column direction wiring of a touch screen according to a prerequisite technique of the first preferred embodiment. FIG. 5 will be described before a shape of the intersection portion of the wirings according to the first preferred embodiment will be described.

In FIG. 5, the wiring widths of the row direction wiring 4 and the column direction wiring 7 are uniform. In FIG. 5, a portion at which the row direction wiring 4 and the column direction wiring 7 overlap in a plan view is defined as an intersection portion 30. Further, regions of the row direction wiring 4 adjacent to the intersection portion 30 are defined as adjacent regions 40*a* and 40*b*. Similarly, regions of the column direction wiring 7 adjacent to the intersection portion 30 are defined as adjacent regions 70*a* and 70*b*.

In the first preferred embodiment, the wiring widths of the row direction wiring 4 and the column direction wiring 7 at the intersection portion 30 in FIG. 5 are made wider than the wiring widths of regions other than the intersection portion 30.

Further, the wiring widths of the adjacent regions 40a, 40b, 70a and 70b in FIG. 5 are made wider similarly to the intersection portion 30. As a result of the above, the shape of the intersection portion of the row direction wiring 4 and the column direction wiring 7 according to the first preferred embodiment illustrated in FIG. 4 is obtained.

By configuring the intersection portion of the row direction wiring 4 and the column direction wiring 7 of the touch screen 1 according to the first preferred embodiment as described above, it is possible to locally increase a cross capacitance at a three-dimensional intersection portion of the row direction wiring 4 and the column direction wiring 7. Thus, a potential difference is hardly produced between the row direction wirings 4 and the column direction wirings 7. Even when the local cross capacitance is increased, an increase ratio of the entire mutual capacitance of the touch screen 1 according to the first preferred embodiment is less than 1%, and therefore detection performance is not influenced.

Further, the configuration in FIG. 4 preferably satisfies the following relationship. That is, $l_1<l_2, l_3\geq0, l_4\geq0, k_1<k_2, k_3\geq0$ and $k_4\geq0$ are true. In this regard, $l_3\geq0$ and $l_4\geq0$ mean that the length (i.e., $l_2+l_3+l_4$) of the region in which the wiring width of the row direction wiring 4 is wider in the direction in which the row direction wiring 4 extends is equal to or more than the wiring width (i.e., 12) of the column direction wiring 7 at the intersection portion 30. That is, when $l_3\geq0$ and $l_4\geq0$ are true, edges B of the row direction wiring 4 overlap the column direction wiring 7 by the width 12 of the column direction wiring 7 at the intersection portion. Consequently, it is possible to alleviate electric field concentration at the edges B of the row direction wiring 4.

Further, $k_3\geq0$ and $k_4\geq0$ mean that the length (i.e., $k_2+k_3+k_4$) of the region in which the wiring width of the column direction wiring 7 is wider in the direction in which the column direction wiring 7 extends is equal to or more than the wiring width (i.e., $k_2$) of the row direction wiring 4 at the intersection portion 30. That is, when $k_3\geq0$ and $k_4\geq0$ are true, edges C of the column direction wiring 7 overlap the row direction wiring 4 by the width $k_2$ of the row direction wiring 4 at the intersection portion. Consequently, it is possible to alleviate electric field concentration at the edges C of the column direction wiring 7.

In this regard, to confirm an effect provided by the configuration (FIG. 4) according to the first preferred embodiment, electrostatic discharge tests of the touch screen 1 (see FIG. 1) according to the first preferred embodiment and a touch screen according to a comparative example in which the mesh of the row direction wirings 4 and the mesh of the column direction wirings 7 were formed to have the uniform wiring widths as in FIG. 5 were conducted under a condition where each transparent substrate 10 was made of a glass material which had the thickness of 1.0 mm, a discharge capacitor of 330 pF and a discharge resistance of 330Ω. As a result, it was found that, in the touch screen according to the comparative example, dielectric breakdown was observed inside the sensor (inside the area) near an end portion on an opposite side to a side at which lead wires of row direction wirings were connected when 12 kV is set. Meanwhile, in the touch screen 1 according to the first preferred embodiment, dielectric breakdown was not observed even when a larger voltage than 12 kV was set, and it was confirmed that the dielectric breakdown would hardly occur in the touch screen 1 according to the first preferred embodiment.

In view of the above, according to the first preferred embodiment, even when a pointer (conductor) such as a finger approaches the touch screen and electrostatic discharge occurs, it is possible to provide a reliable touch screen which suppresses occurrence of dielectric breakdown due to the electrostatic discharge.

In addition, the transparent substrate 2 illustrated in FIG. 1 may be a color filter substrate of a liquid crystal display.

Figure 6:
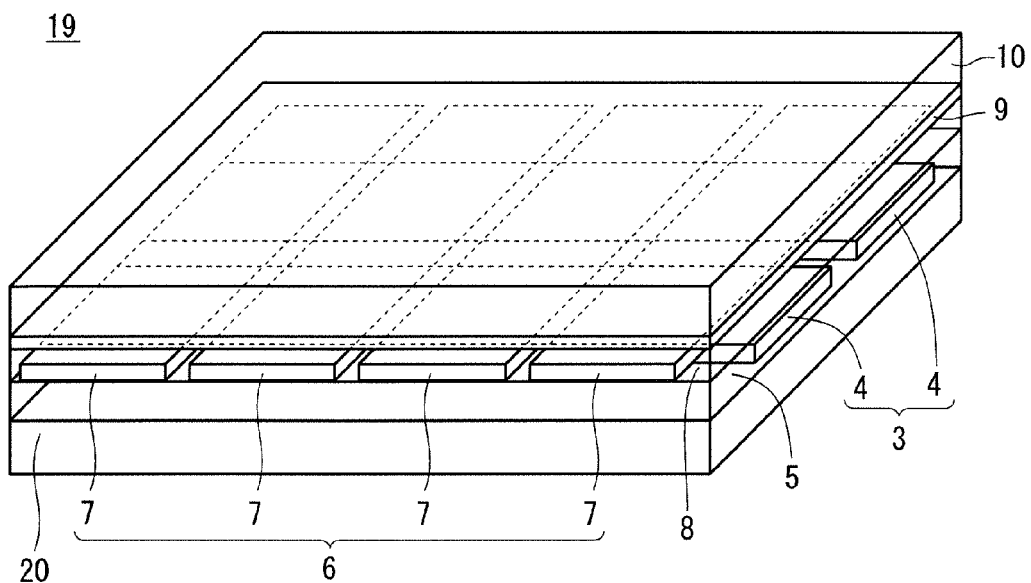
FIGS. 6 and 7 are views each illustrating another example of a configuration of the touch screen according to the first preferred embodiment of the present invention.

FIG. 6 is a perspective view illustrating a configuration of a touch screen 19. The touch screen 19 is provided with a color filter substrate 20 instead of the transparent substrate 2 in FIG. 1. The other components are the same as those in FIG. 1. By employing the configuration illustrated in FIG. 6, it is possible to allow common use of the transparent substrate of the touch screen and the color filter substrate of the liquid crystal display. Consequently, it is possible to make thinner the entirety of the liquid crystal display to which the touch screen 19 is attached.

Figure 7:
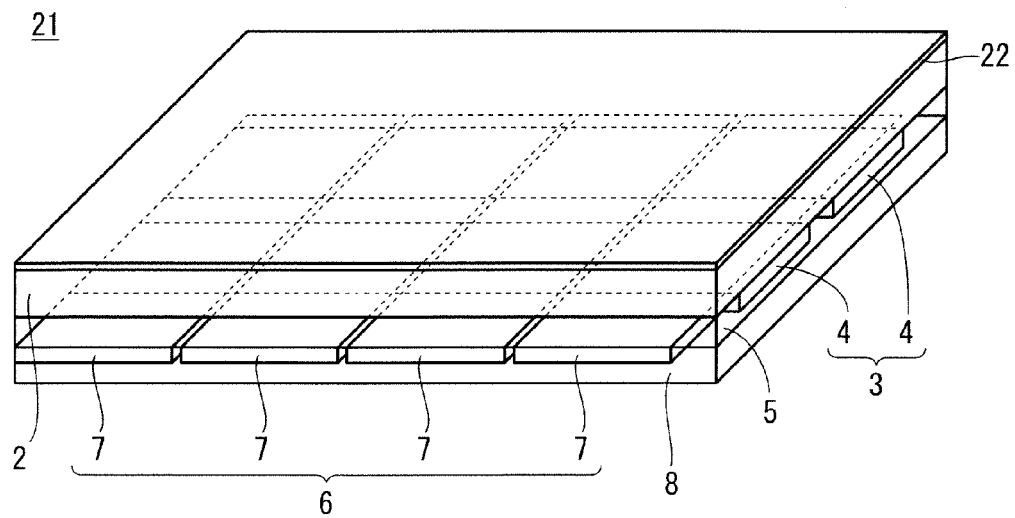

Further, like a touch screen 21 illustrated in FIG. 7, a polarizing plate 22 may be provided (attached) to a back surface side of the transparent substrate 2 of the touch screen 1 illustrated in FIG. 1, and the touch screen 21 may be attached to the liquid crystal display with the polarizing plate 22 side directed toward the display surface side. In this case, the transparent substrate 2 plays a role of protecting the touch screen 21 and it is possible to remove the transparent substrate 10 illustrated in FIG. 1. Consequently, it is possible to make thinner the entirety of the liquid crystal display to which the touch screen 21 is attached.

Effect

The touch screen 1 according to the first preferred embodiment includes a substrate (transparent substrate 2), and a plurality of row direction wirings 4 and a plurality of column direction wirings 7 disposed on the substrate to intersect through an insulating film (inter-layer insulating film 5) in a stereoscopic view. At an intersection portion 30 of each of the row direction wirings 4 and each of the column direction wirings 7, the wiring width of at least one of the row direction wiring 4 and the column direction wiring 7 is wider than a portion other than the intersection portion 30 in a plan view.

Consequently, by widening the wiring width of at least one of the row direction wiring 4 and the column direction wiring 7 at the intersection portion 30, it is possible to locally increase cross capacitance at three-dimensional intersection portion of the row direction wiring 4 and the column direction wiring 7. Thus, a potential difference is hardly produced between the row direction wirings 4 and the column direction wirings 7. Consequently, it is possible to provide the reliable touch screen 1 which suppresses occurrence of dielectric breakdown due to electrostatic discharge.

Further, in the touch screen 1 according to the present preferred embodiment, each of the row direction wirings 4 has wider wiring width also in the adjacent regions 40a and 40b adjacent to the intersection portion 30, and each of the column direction wirings 7 has wider wiring width also in the adjacent regions 70a and 70b adjacent to the intersection portion 30.

Hence, by widening the wiring widths of the row direction wiring 4 and the column direction wiring 7 also in the adjacent regions 40a, 40b, 70a and 70b adjacent to the intersection portion 30, it is possible to locally increase the cross capacitance at the three-dimensional intersection portion of the row direction wiring 4 and the column direction wiring 7. Thus, a potential difference is hardly produced between the row direction wirings 4 and the column direction wirings 7. Consequently, it is possible to provide the reliable touch screen 1 which further suppresses occurrence of dielectric breakdown due to electrostatic discharge.

Further, in the touch screen 1 according to the first preferred embodiment, a length of a region in which the wiring width of the row direction wiring 4 is wider in the direction in which the row direction wiring 4 extends is equal to or more than the wiring width of the column direction wiring 7 at the intersection portion 30. Furthermore, a length of a region in which the wiring width of the column direction wiring 7 is wider in the direction in which the column direction wiring 7 extends is equal to or more than the wiring width of the row direction wiring 4 at the intersection portion 30.

Consequently, it is possible to alleviate electric field concentration at the edges B of the row direction wiring 4 and the edges C of the column direction wiring 7. Consequently, it is possible to provide the more reliable touch screen 1 which further suppresses occurrence of dielectric breakdown due to electrostatic discharge.

Further, in the touch screen 1 according to the first preferred embodiment, the row direction wirings 4 and the column direction wirings 7 are meshed metal wirings.

Consequently, the row direction wirings 4 and the column direction wirings 7 are meshed wirings, so that a small wiring area can cover a broad detectable area.

Second Preferred Embodiment

In the first preferred embodiment, only a case where both of the wiring width of a row direction wiring 4 and the wiring width of a column direction wiring 7 are wider at a portion at which the row direction wiring 4 and the column direction wiring 7 three-dimensionally intersect across an inter-layer insulating film 5 has been described. Meanwhile, features of the second preferred embodiment include that the wiring width of the column direction wiring 7 is wider at the intersection portion, and the wiring width of the row direction wiring 4 is uniform. A configuration of the touch screen according to the second preferred embodiment is the same as that of the first preferred embodiment (FIGS. 1 to 3), and therefore will not be described.

In addition, similar to the first preferred embodiment (see FIGS. 1 and 2), in the second preferred embodiment, the row direction wirings 4 are formed as a lower electrode 3, and the column direction wirings 7 are formed as an upper electrode 6.

Figure 8:
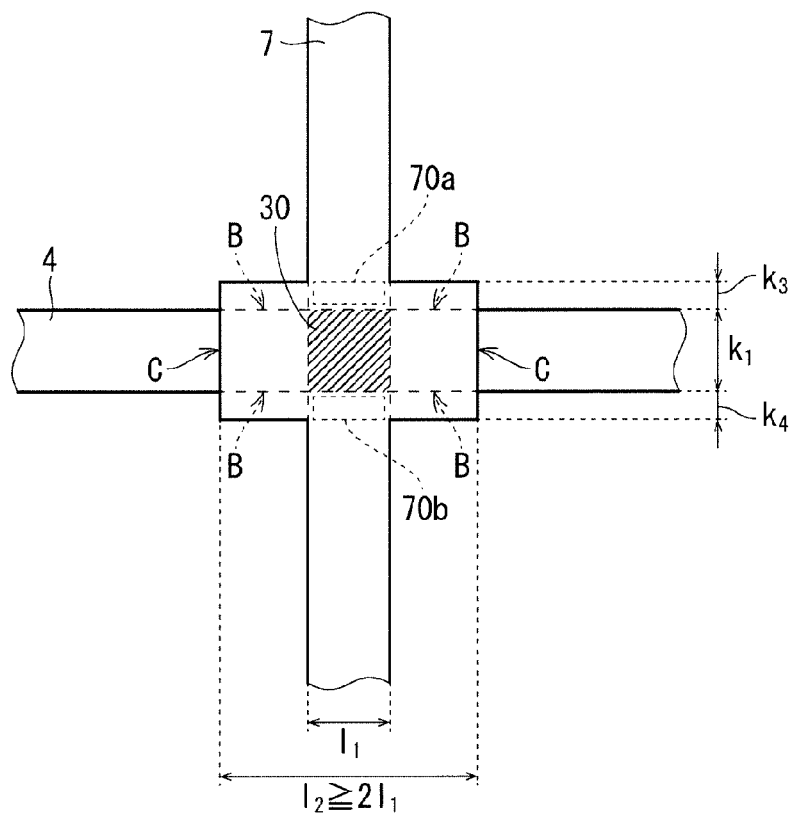
FIG. 8 is an enlarged view of an intersection portion of a row direction wiring and a column direction wiring of a touch screen according to a second preferred embodiment.

FIG. 8 is an enlarged view illustrating a region A in FIG. 3 in which the touch screen is replaced by the touch screen 1 according to the second preferred embodiment (i.e., the enlarged view of the intersection portion of the row direction wiring 4 and the column direction wiring 7). As illustrated in FIG. 8, at a portion at which the row direction wiring 4 and the column direction wiring 7 three-dimensionally intersect across the inter-layer insulating film 5, only the wiring width of the column direction wiring 7 is wider.

By employing the above configuration, it is possible to provide the effect according to the first preferred embodiment, and, in addition, reduce regions in which wirings are wider in a plan view while increasing a local cross capacitance.

Consequently, it is possible to prevent a pattern from becoming visible, because the wiring widths do not become wider.

Further, the configuration in FIG. 8 preferably satisfies the following relationship. That is, $l_2 \geq 2 l_1$, $k_3 \geq 0$ and $k_4 \geq 0$ are true. In this regard, when $k_3 \geq 0$ and $k_4 \geq 0$ are true, edges C of the column direction wiring 7 overlap the row direction wiring 4 by the width $k_1$ of the row direction wiring 4. Consequently, it is possible to alleviate electric field concentration at the edges C of the column direction wiring 7.

Figure 9:
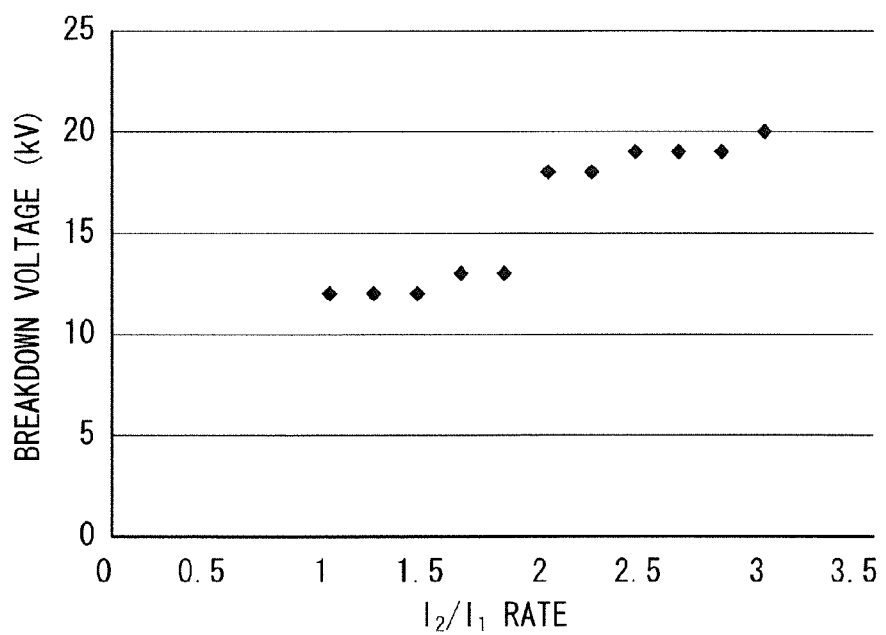
FIG. 9 is a view illustrating a relationship between a dielectric breakdown voltage of the touch screen and $l_2/l_1$ according to the second preferred embodiment.

FIG. 9 is a view illustrating a relationship between a dielectric breakdown voltage of the touch screen and $l_2/l_1$ according to the present preferred embodiment. In the range of $l_2 \geq 2 l_1$, the dielectric breakdown voltage is remarkably high. This is because charges expanding at a portion at which the edges B of the row direction wiring 4 and the column direction wiring 7 overlap become low.

In order to check an effect provided by the configuration (FIG. 8) according to the second preferred embodiment, a surface of the touch screen 1 according to the second preferred embodiment and a surface of the touch screen 1 according to first preferred embodiment (FIG. 4) as a comparative example were checked under irradiation of light of 100 thousand lux. As a result, wirings of the touch screen 1 according to the comparative example (first preferred embodiment) were visible since reflection from portions at which the wiring widths of the row direction wirings 4 and the wiring widths of the column direction wirings 7 were wide was strong. Meanwhile, the wirings of the touch screen 1 according to the second preferred embodiment were not visible even at the intersection portions of the row direction wirings 4 and the column direction wirings 7. As a result, it was possible to confirm that the touch screen 1 according to the second preferred embodiment hardly caused dielectric breakdown similarly to the first preferred embodiment, and, in addition, could improve appearance of the wirings with respect to reflected light.

In addition, a case of the touch screen 1 illustrated in FIG. 1 has been described above as an example. However, a touch screen 19 illustrated in FIG. 6 and a touch screen 21 illustrated in FIG. 7 can also provide the same effects.

Further, in the second preferred embodiment, at the intersection portion, the wiring widths of the column direction wirings 7 are wider, and the wiring widths of the row direction wirings 4 are uniform. However, it is also possible to provide the same effect by making wider the wiring widths of the row direction wirings 4 and making uniform the wiring widths of the column direction wirings 7 at the intersection portions.

Effect

According to the touch screen 1 of the present preferred embodiment, at the intersection portion 30, one of the wiring widths of the row direction wiring 4 and the column direction wiring 7 is twice or more wider than the wiring width at the portion other than the intersection portion 30, and the other one of the wiring widths is fixed. The wiring widths of one of the row direction wiring 4 and the column direction wiring 7 which is wider at the intersection portion 30 is wider also in the adjacent regions 40a and 40b adjacent to the intersection portion 30.

Hence, according to the touch screen 1 according to the second preferred embodiment, the wirings are hardly visible at the intersection portions of the row direction wirings 4 and the column direction wirings 7. As a result, touch screen 1 according to the second preferred embodiment hardly causes dielectric breakdown similarly to the first preferred embodiment, and, in addition, can improve appearance of wirings with respect to reflected light.

Third Preferred Embodiment

In the first and second preferred embodiments, cases where, at portion at which the row direction wiring 4 and the column direction wiring 7 three-dimensionally intersect across an inter-layer insulating film 5, the wiring width of the row direction wiring 4 and the wiring width of the column direction wiring 7 are wider have been described. Features of the third preferred embodiment include that, in a region in which the wiring width is wider, an outline of the wiring is curved unlike an angular shape in a plan view in the first preferred embodiment. A configuration of a touch screen 1 according to the third preferred embodiment is the same as that of the first preferred embodiment (FIGS. 1, 2 and 3), and therefore will not be described.

In addition, similar to the first preferred embodiment (see FIGS. 1 and 2), in the third preferred embodiment, the row direction wirings 4 are formed as a lower electrode 3, and the column direction wirings 7 are formed as an upper electrode 6.

Figure 10:
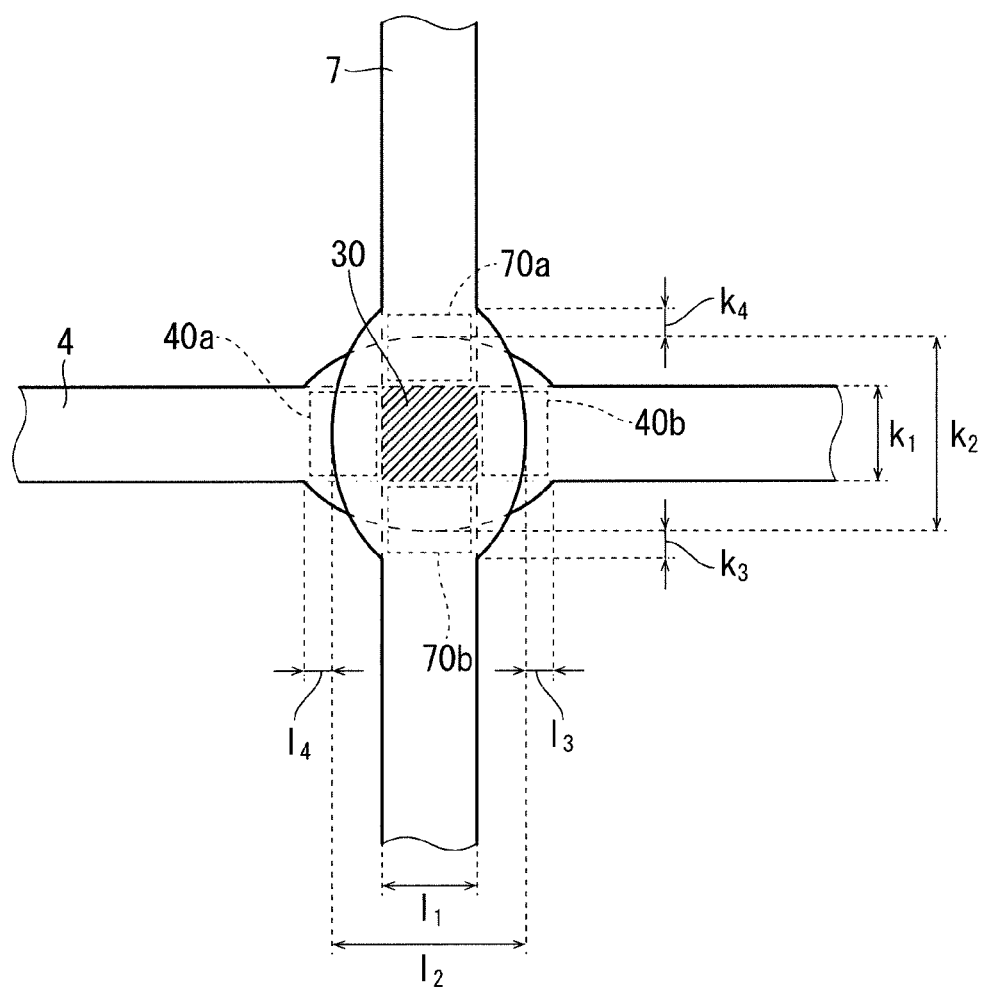
FIG. 10 is an enlarged view of an intersection portion of a row direction wiring and a column direction wiring of a touch screen according to a third preferred embodiment.

FIG. 10 is an enlarged view illustrating a region A in FIG. 3 in which the touch screen is replaced by the touch screen 1 according to the third preferred embodiment (i.e., the enlarged view of an intersection portion of the row direction wiring 4 and the column direction wiring 7). As illustrated in FIG. 9, at a portion at which the row direction wiring 4 and the column direction wiring 7 three-dimensionally intersect through the inter-layer insulating film, the wiring width of the row direction wiring 4 and the wiring width of the column direction wiring 7 are wider. The outlines of the row direction wiring 4 and the column direction wiring 7 are curved in a plan view in the region in which the wiring widths are wider.

When wirings have angular shapes, light is strongly reflected at the angular portions, so that the wirings become easily visible. Meanwhile, by forming the wirings in curved shapes as in the present preferred embodiment, it is possible to prevent the wirings from becoming easily visible.

The touch screen according to the third preferred embodiment can improve appearance of the wirings with respect to reflected light while securing the same electrostatic discharge resistance (ESD) as that of the touch screen 1 according to the first preferred embodiment.

In addition, a case of the touch screen 1 illustrated in FIG. 1 has been described above as an example. However, a touch screen 19 illustrated in FIG. 6 and a touch screen 21 illustrated in FIG. 7 can also provide the same effects.

Modified Example

Figure 11:
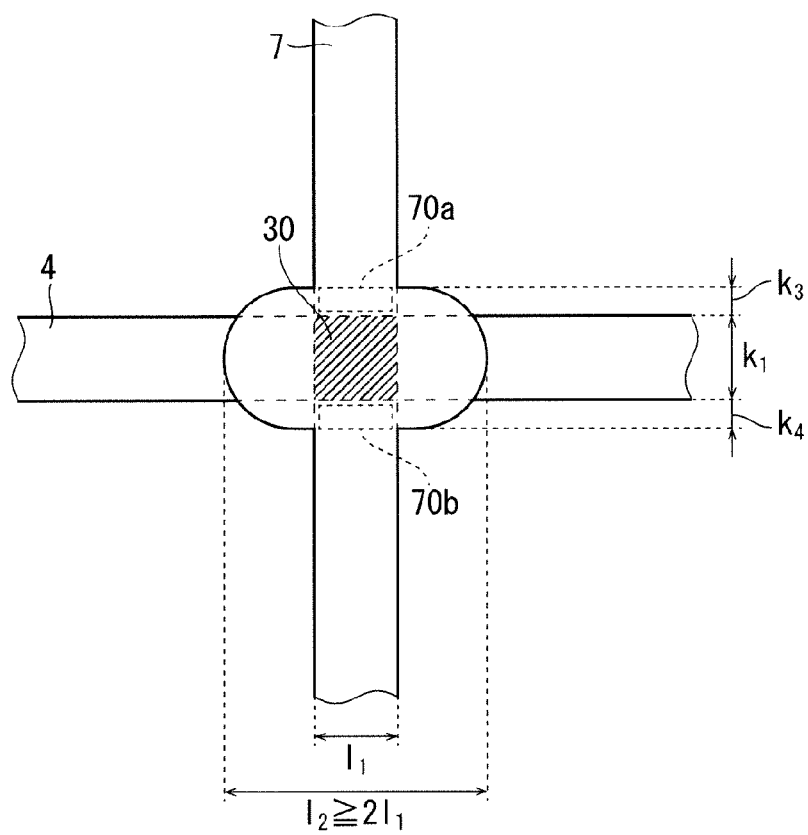
FIG. 11 is an enlarged view of an intersection portion of a row direction wiring and a column direction wiring of a touch screen according to a modified example of the third preferred embodiment.

FIG. 11 is an enlarged view of an intersection portion of a row direction wiring 4 and a column direction wiring 7 according to the modified example of the third preferred embodiment. As illustrated in FIG. 11, at a portion at which the row direction wiring 4 and the column direction wiring 7 three-dimensionally intersect through an inter-layer insulating film, the wiring width of the column direction wiring 7 is wider and the wiring width of the row direction wiring 4 is uniform. The outline of the column direction wiring 7 is curved in a plan view in the region in which the wiring width of the column direction wiring 7 is wider.

Further, in FIG. 11, a relationship of $l_2 \geq 2\,l_1$, $k_3 \geq 0$ and $k_4 \geq 0$ is preferably satisfied similarly to the second preferred embodiment (FIG. 8).

According to the configuration of the present modified example, it is possible to improve appearance of the touch screen with respect to reflected light while securing the same ESD resistance as that of a touch screen 1 according to the second preferred embodiment.

In addition, in the modified example of the third preferred embodiment, at the intersection portion, the wiring width of the column direction wiring 7 is wider, and the wiring width of the row direction wiring 4 is uniform. However, it is also possible to provide the same effect by making wider the wiring width of the row direction wiring 4 and making uniform the wiring width of the column direction wiring 7 at the intersection portion.

Effect

In the modified example of the touch screen 1 of the third preferred embodiment, the outline of the row direction wiring 4 is curved in a plan view in the region in which the wiring width of the row direction wiring 4 is wider, and the outline of the column direction wiring 7 is curved in a plan view in the region in which the wiring width of the column direction wiring 7 is wider.

Consequently, by curving the outlines of the row direction wiring 4 and the column direction wiring 7 at the intersection portion of the row direction wiring 4 and the column direction wiring 7, it is possible to suppress reflected light at the intersection portion, and prevent the intersection portion from becoming visible.

In the modified example of the touch screen 1 of the third preferred embodiment, the outline of the row direction wiring 4 is curved in a plan view in the region in which the wiring width of the row direction wiring 4 is wider, or the outline of the column direction wiring 7 is curved in a plan view in the region in which the wiring width of the column direction wiring 7 is wider.

Consequently, by curving the outline of the row direction wiring 4 or the column direction wiring 7 at the intersection portion of the row direction wiring 4 and the column direction wiring 7, it is possible to suppress reflected light at the intersection portions, and prevent the intersection portions from becoming visible.

Fourth Preferred Embodiment

Figure 12:
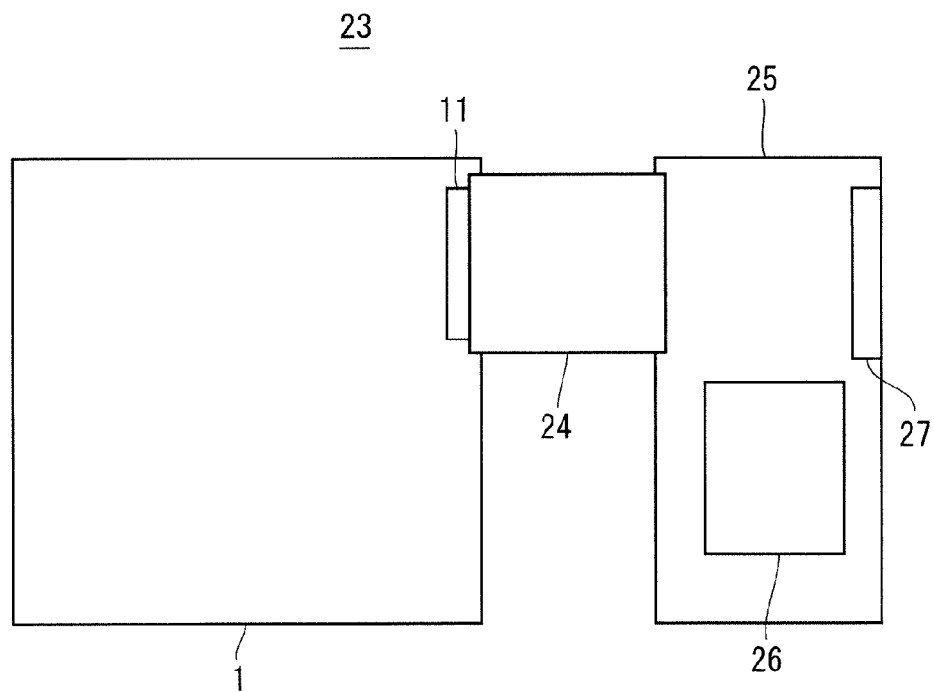
FIG. 12 is a view illustrating an example of a configuration of a touch panel according to a fourth preferred embodiment.

FIG. 12 is a plan view schematically illustrating an example of a configuration of a touch panel 23 according to the fourth preferred embodiment. The touch panel 23 includes the touch screen 1 according to the first preferred embodiment illustrated in FIG. 1, a flexible printed circuit board 24 and a controller substrate 25.

A terminal 11 of the touch screen 1 is connected with the flexible printed circuit board 24 which includes a terminal (a terminal corresponding the terminal 11) mounted by using an anisotropic conductive film or the like. The touch screen 1 functions as a main component of the touch panel 23 by electrically connecting row direction wirings 4 and column direction wirings 7 of the touch screen 1, and the controller substrate 25 through the flexible printed circuit board 24.

A touch position detection circuit 26 is mounted on the controller substrate 25. When applied a signal voltage, the touch position detection circuit 26 detects a touch capacitance including an electrostatic capacitance produced between a pointer and the row direction wirings 4 or the column direction wirings 7. Further, the touch position detection circuit 26 performs processing of calculating a touch position (position coordinate) of the pointer on the touch screen 1 based on the touch capacitance detection result. That is, the touch position detection circuit 26 detects the position pointed by the pointer on the touch screen 1 based on an electrostatic capacitance between the pointer which points to the touch screen 1 and the row direction wirings 4 or the column direction wirings 7.

A projected capacitive detection logic can be adopted for the touch position detection circuit 26. Further, the controller substrate 25 includes an external connection terminal 27 which outputs the touch position (position coordinate) calculated by the touch position detection circuit 26, to an external processing device.

As described above, according to the fourth preferred embodiment, the touch panel 23 includes the touch screen 1 (see FIG. 1) according to the first preferred embodiment. Consequently, when the touch panel 23 is attached to a liquid crystal display, it is possible to provide the touch panel 23 which suppresses a decrease in a contrast of video images and the like due to dielectric breakdown caused by electrostatic discharge on the touch screen 1.

In addition, a case where the touch screen according to the first preferred embodiment is used has been described above. However, the present invention is not limited to this. It is possible to provide the same effect even when, for example, the touch screen according to the second preferred embodiment, the touch screen according to the third preferred embodiment, a touch screen 19 illustrated in FIG. 6 or a touch screen 21 illustrated in FIG. 7 is used.

Further, the touch position detection circuit 26 may be mounted not only on the controller substrate 25 but also on a transparent substrate 2 of the touch screen 1.

Effect

The touch panel 23 according to the fourth preferred embodiment includes the touch screen 1, and the touch position detection circuit 26 which detects the position pointed by the pointer on the touch screen 1 based on an electrostatic capacitance formed between the row direction wirings 4 and the column direction wirings 7.

Consequently, according to the fourth preferred embodiment, it is possible to provide a projected capacitive touch panel which includes the reliable touch screen 1 which suppresses occurrence of dielectric breakdown due to electrostatic discharge.

Fifth Preferred Embodiment

A display device according to the fifth preferred embodiment includes the touch panel 23 (see FIG. 12) according to the fourth preferred embodiment, and a display element (e.g. a liquid crystal display element (LCD: Liquid Crystal Display)) (not illustrated) which can display information.

The touch panel 23 is arranged closer to a user side than a display screen of the liquid crystal display element. In other words, the liquid crystal display element is arranged on an opposite side to a side from which the touch screen of the touch panel 23 is pointed. By employing such a configuration, it is possible to provide the display device with the touch panel which has a function of detecting a touch position pointed by a user.

As described above, according to the fifth preferred embodiment, it is possible to provide the display device with the projected capacitive touch panel which suppresses a decrease in a contrast and provides good visibility.

Effect

The display device according to the fifth preferred embodiment includes the touch panel 23, and a display element which is arranged on the opposite side to the side from which the touch screen 1 of the touch panel 23 is pointed, and can display information.

Consequently, according to the fifth preferred embodiment, it is possible to provide the display device which includes the reliable touch screen 1 which suppresses occurrence of dielectric breakdown due to electrostatic discharge.

Sixth Preferred Embodiment

An electronic device according to the sixth preferred embodiment includes the touch panel 23 (see FIG. 12) according to the fourth preferred embodiment, and a signal processor (not illustrated) (an electronic processor) which is an electronic element.

The signal processor receives an input of a signal (touch position) outputted from an external connection terminal 27 of the touch panel 23, and outputs the signal as a digital signal. That is, the signal processor electronically performs predetermined processing on information of the touch position detected by a touch position detection circuit 26 of the touch panel 23. Thus, by employing a configuration where the signal processor is connected to the touch panel 23, it is possible to provide the electronic device with a touch position detection function such as a digitizer which outputs information of a touch position detected by the touch position detection circuit 26 of the touch panel 23, to an external signal processing device such as a computer.

In addition, the signal processor may be built in (mounted on) a controller substrate 25 of the touch panel 23. In this case, the signal processor has an output function which satisfies bus standards such as a USB (Universal Serial Bus), so that it is possible to realize the versatile electronic device with the touch position detection function.

As described above, according to the sixth preferred embodiment, it is possible to provide the electronic device with the projected capacitive touch position detection function which suppresses a decrease in a contrast and provides good visibility.

Effect

The electronic device according to the sixth preferred embodiment includes the touch panel 23, and the electronic processor which electronically performs predetermined processing on information of the position detected by the touch position detection circuit 26 of the touch panel 23.

Consequently, according to the sixth preferred embodiment, it is possible to provide the electronic device which includes the reliable touch screen 1 which suppresses occurrence of dielectric breakdown due to electrostatic discharge.

While the invention has been shown and described in detail, the foregoing description is in all aspects illustrative and not restrictive. It is therefore understood that numerous modifications and variations can be devised without departing from the scope of the invention.

What is claimed is:

1. A touch screen comprising:
    a substrate; and
    a plurality of row direction wirings and a plurality of column direction wirings which are disposed on said substrate to intersect through an insulating film in a stereoscopic view,
    wherein, throughout an intersection portion of each of said row direction wirings and each of said column direction wirings, the wiring widths of each of said row direction wirings and each of said column direction wirings are wider than a wiring width of each respective row direction wiring or each respective column direction wiring in a portion other than said intersection portion in a plan view and consequently capacitance at said intersection portion is increased with respect to said portion other than said intersection portion, and
    an occurrence of dielectric breakdown of said insulating film due to a touch on said touch screen is suppressed by said increased capacitance.

2. The touch screen according to claim 1, wherein each of said row direction wirings has wider wiring width also in adjacent regions adjacent to said intersection portion, and each of said column direction wirings has wider wiring width also in adjacent regions adjacent to said intersection portion.

3. The touch screen according to claim 2, wherein
a length of a region in which the wiring width of said row direction wiring is wider in a direction in which the row direction wiring extends is equal to or more than the wiring width of said column direction wiring at said intersection portion, and
a length of a region in which the wiring width of said column direction wiring is wider in a direction in which the column direction wiring extends is equal to or more than the wiring width of said row direction wiring at said intersection portion.

4. The touch screen according to claim 1, wherein
at said intersection portion, one of the wiring widths of said row direction wiring and said column direction wiring is twice or more wider than the wiring width at the portion other than said intersection portion, and the other one of the wiring widths is uniform, and
the wiring width of one of said row direction wiring and said column direction wiring which is wider at said intersection portion is wider also in the adjacent regions adjacent to said intersection portion.

5. The touch screen according to claim 2, wherein
an outline of each of said row direction wirings is curved in a plan view in the region in which said wiring width of said row direction wiring is wider, and
an outline of each of said column direction wirings is curved in a plan view in the region in which said wiring width of said column direction wiring is wider.

6. The touch screen according to claim 4, wherein
an outline of each of said row direction wirings is curved in a plan view in the region in which said wiring width of said row direction wiring is wider, or
an outline of each of said column direction wirings is curved in a plan view in the region in which said wiring width of said column direction wiring is wider.

7. The touch screen according to claim 1, wherein said row direction wirings and said column direction wirings are meshed metal wirings.

8. A touch panel comprising:
the touch screen according to claim 1; and
a touch position detection circuit which detects a position pointed by a pointer on said touch screen, based on an electrostatic capacitance formed between said row direction wirings and said column direction wirings.

9. A display device comprising:
the touch panel according to claim 8; and
a display element which is disposed on an opposite side to a side from which said touch screen of said touch panel is pointed, and can display information.

10. An electronic device comprising:
the touch panel according to claim 8; and
a processor which electronically performs predetermined processing on information of said position detected by said touch position detection circuit of said touch panel.

* * * * *